Figure 1:
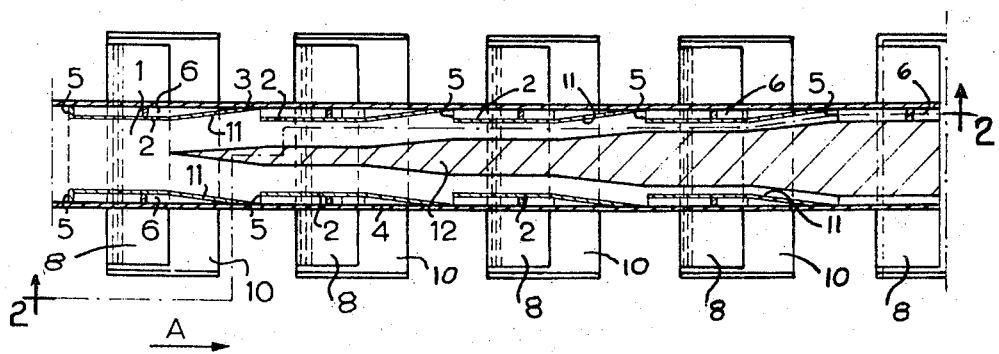

United States Patent Office 3,037,629
Patented June 5, 1962

3,037,629
SEPARATING A MIXTURE OF SOLID PARTICLES OF VARIOUS SIZES SUSPENDED IN LIQUID
Freerk J. Fontein, Heerlen, Hubert H. Dreissen, Geleen, and Hubertus F. Jennekens, Heerlen, Netherlands, assignors to Stamicarbon N.V., Heerlen, Netherlands
Filed Dec. 21, 1959, Ser. No. 860,910
Claims priority, application Netherlands Dec. 23, 1958
4 Claims. (Cl. 209—254)

The present invention relates to an installation for separating a mixture of solid particles of various sizes suspended in liquid, and more particularly to an installation of the type including a number of sieve bends arranged in parallel, a trough located over the sieve bends and provided with rectangular slot-shaped ports through which the suspension is fed to the sieve bends and which open into the trough.

The term sieve bend refers to a fixed, curved, sloping screen to which the material is fed in a tangential direction to the concave side, the dimension of the screen openings, measured at right angles to the direction of flow of the material, being equal to or greater than the dimension of the openings measured in the direction of flow of the material. A detailed description of the construction and operation of a sieve bend can be found in co-pending application Serial No. 475,251, filed on December 14, 1954, now Patent No. 2,916,142. A sieve bend also includes a screen in which the radius of curvature is infinite.

The above-described installation is preferably used for obtaining upgraded spouting sand, the raw product being raised by means of a stand-pump dredger. The flow-rate, which may reach a maximum of a few thousand cu. m. per hour, may vary strongly, and may even fall off to 25% of the maximum.

In this known installation the bottom of the trough is provided with a feed slot for each separate sieve bend, through which the suspension is fed tangentially to the sieve bend. With this arrangement one or more of the sieve bends will be fully loaded and one sieve bend will mostly be underloaded depending upon the amount of material raised. The result is that there is a chance of the latter sieve bend being blocked and, what is more, of screening to a different size than the fully loaded sieve bends. Another disadvantage is that the first sieve bend has to handle coarser material than the following bends. The above-mentioned disadvantages are of lesser importance in the recovery of spouting sand. However, the situation is different when concrete sand is to be obtained, in which case sand of a suitable composition, recovered from sand-gravel deposits outside the beds of large rivers, is first passed over one or more primary sieve bends having openings of 10–14 mm. measured in the direction of flow of the material and the concrete sand is obtained as the wet overflow fraction from one or more secondary sieve bends having openings of 1–3 mm. measured in the direction of flow of the material. The particle size distribution of concrete sand has to satisfy very high demands. Conditions under which one of the secondary sieve bends fails to function properly cannot be tolerated.

The present invention, which relates both to an installation not comprising a primary screen and to an intallation comprising one or more primary screens, not only envisages elimination of the above-mentioned drawbacks, but has also for its object to provide:

(1) Equal feed capacity for all sieve bends as regards the amount of suspension per unit of screen surface area;
(2) Equal feed concentration of the solid substance;
(3) A proper distribution over the entire width of the sieve bend of the material fed onto it;
(4) An installation which takes up as little room as possible;
(5) An installation in which the overflow concentration and the classification are not too dependent on the feed capacity.

Another object of the present invention is the provision of an installation of the type described wherein the trough feed ports are substantially vertically disposed and extend from the trough bottom upwards and have an effective height of not less than the greatest height of the suspension in the trough, while the sum of the port areas is substantially equal to the cross-sectional area of the trough before the first port, the ratio between the effective surface areas of the sieve bends and the passage area or areas of the corresponding port or set of ports is equal for all the sieve bends and, after each port or set of ports serving a sieve bend, the cross sectional area of the trough decreases by the area of such port or set of ports.

Another object of the present invention is the provision of an installation of the type described in which the arrangement is such that, independent of the rate at which the material is fed, the distance from the surface of the suspension to the bottom of the trough remains the same at all ports, while the material is fed at a uniform rate to the sieve bends and a uniform separation of the material on all the sieve bends is insured. Preferably all the sieve bends are identical, in which case all the ports are identical.

Still another object of the present invention is the provision of an installation of the type described in which each sieve bend is provided with a distributor of a known type with one or more discharge openings, the total passage area of which is so dimensioned that at the lowest permissible feed rate of the suspension to be treated, a sufficient amount of the suspension is still present in each distributor that the discharge opening is entirely filled, such discharge opening preferably comprising a slot or instead of the slot a number of openings may be provided. The distributor must be so dimensioned that even at the highest feed rate it is not quite full.

In case of variations in the feed rate the level in the distributor will also vary. However, since the capacity of a sieve bend is proportionate to the feed rate and the latter is dependent on the level of the suspension in the distributor, a self-controlling action sets in during which the sharpness of separation, at an otherwise unaltered concentration of the solid particles in the feed, remains substantially constant too.

The cross-sectional area of the trough after each port, or series of ports, can be reduced in different ways. For instance after each port, or series of ports, the trough can be made correspondingly smaller. However, this results in the ports getting gradually nearer to the axis of the trough, so that the distribution of the suspension fed through the ports into the distributors is altered.

Accordingly a further object of the present invention is the provision of an installation of the type described in which a feed port is provided on either side of the trough in or adjacent to the wall, while in the axis of the trough a symmetrical displacement body is provided, the width of which is everywhere substantially equal to the sum of the widths of the ports located upstream.

These and other objects of the present invention will become more apparent during the course of the following detailed description and appended claims.

The invention may best be understood with reference to the accompanying drawings wherein an illustrative embodiment is shown.

Figure 2:
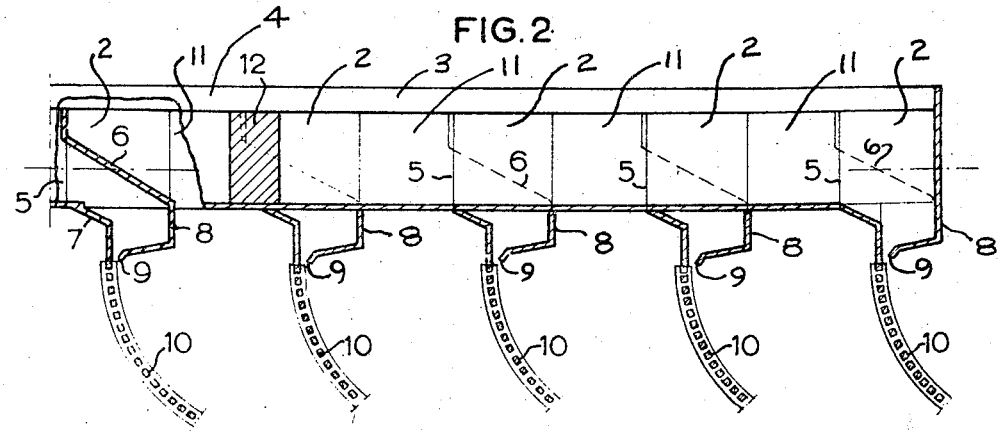

In the drawings:

FIGURE 1 is a horizontal sectional plan view of an installation embodying the principles of the present invention; and FIGURE 2 is a sectional view of the installation taken along the lines 2—2 of FIGURE 1, with certain parts broken away for purposes of clearer illustration.

Referring now more particularly to the drawings, there is shown an installation embodying the principles of the present invention which includes a feed trough 1, which is open at the top and has a substantially rectangular cross-sectional configuration. Feed ports 5 are provided in the trough by means of plates 2 which run substantially parallel to side walls 3 and 4 respectively of the trough. The space between the plates 2 and the side walls 3 and 4 is shut off at the top by a sloping plate 6 while the part of the trough bottom which would shut off this space at the bottom, has been left out and replaced by a plate 7. The plate 7, together with the extended walls 3 and 4 and the extended plates 2, form a feed passage to a distributor 8, which is attached to the bottom of the trough 1. The distributor 8 has at its bottom a slot-shaped opening 9, under which a sieve bend 10 is placed in the usual way. The obliquely disposed plates 11 form gradual transitions from the ends of the plates 2 to the walls 3 and 4, where a second set of ports is provided identical to the first set.

The ports 5 have an effective height not less than the greatest height of suspension in the trough 1, while the sum of the areas of the ports 5 are substantially equal to the cross-sectional area of the trough 1 before the first port. The ratio between the effective surface area of each of the sieve bends 10 and the port passage area associated therewith is equal for all sieve bends.

A displacement body 12 is mounted in the axis of the trough 1. At the second set of ports the width of this body is equal to the sum of the widths of the first set of ports, and at the third set of ports it equals the sum of the first and the second set of ports, etc. As shown in FIGURE 1 the displacement body has a succession of alternating parallel and diverging planes, the latter planes running parallel to the obliquely disposed planes 11. In this way the flow area of the trough is everywhere equal to that of the ports that are still to be served. It should also be noted that the collective widths of the ports are equal to the original width of the trough.

Each distributor 8, the length of which is substantially equal to the width of the sieve bend, projects on both sides of the trough 1. The feed passages all debouch into these distributors in the same way, i.e. at distances of between 1/6 and 1/3 of the width of the sieve bend from the symmetry plane through the axis of the trough. This arrangement insures that each distributor is fed uniformly.

Of the suspension flowing in the direction indicated by the arrow A a vertical layer is sliced off at each port 5 and transported to the corresponding distributor 8. Since after each port, or set of ports, the cross-sectional area of the trough decreases by the width of the port, or the set of ports, the level of the suspension remains the same throughout the trough, so that each distributor receives the same amount of suspension, irrespective of the level of the suspension in the trough. Consequently, all the sieve bends of the system will always classify in the same way.

Since the feed rate to each distributor depends on the level in the trough, the level in the distributor will vary with the rate at which the suspension is fed. The velocity at which the material issues from each slot-shaped opening 9 is determined by the level of the suspension in the associated distributor. The capacity of the sieve bend, i.e. the amount of suspension passing through the sieve bend depends on the velocity of the suspension. Consequently, the sharpness of the separation and the particle size to which the separation is made remain uninfluenced by variations in feed rate, so that a uniform end-product is obtained.

It will thus be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. An installation for separating a mixture of solid particles of various sizes suspended in liquid, comprising a number of sieve bends arranged in parallel, a feed trough disposed above said sieve bends and having rectangular slot-shaped feed ports therein for said sieve bends, said feed ports being disposed substantially vertically and extending upwardly from the bottom of said trough, said ports having an effective height of not less than the greatest height of the suspension in the trough, the sum of the port areas being substantially equal to the cross-sectional area of the trough before the first port, the ratio between the effective surface area of each sieve bend and the port passage area associated therewith being equal for all sieve bends, the cross sectional area of the trough decreasing in the direction of flow after feeding each sieve bend by an amount equal to the port area of the sieve bend fed.

2. An installation as defined in claim 1, wherein each sieve bend is provided with a distributor having discharge opening means, the flow passage of which is so dimensioned that at the lowest permissible feed rate of the suspension to be treated there is still so much suspension in each distributor that said discharge opening means is entirely filled.

3. An installation as defined in claim 1, wherein a feed port is provided for each sieve bend adjacent each side wall of said trough, and wherein a symmetrical displacement body is provided along the axis of said trough, the width of which is everywhere substantially equal to the sum of the widths of the ports located upstream.

4. An installation as defined in claim 3 wherein the sieve bends are considerably wider than the trough, said feed ports are provided with guide members for feeding the suspension into the distributor on either side of the symmetry plane of each sieve bend and at distances of between 1/6 and 1/3 of the width of the associated sieve bend.

References Cited in the file of this patent

FOREIGN PATENTS 1,045,272  France _____ June 24, 1953